United States Patent
Muth et al.

(10) Patent No.: US 8,819,399 B1
(45) Date of Patent: Aug. 26, 2014

(54) PREDICATED CONTROL FLOW AND STORE INSTRUCTIONS FOR NATIVE CODE MODULE SECURITY

(75) Inventors: Robert Muth, New York, NY (US);
Karl Schmipf, Santa Cruz, CA (US);
David C. Sehr, Cupertino, CA (US);
Clifford L. Biffle, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1019 days.

(21) Appl. No.: 12/623,244

(22) Filed: Nov. 20, 2009

Related U.S. Application Data (63) Continuation-in-part of application No. 12/621,286, filed on Nov. 18, 2009, now Pat. No. 8,561,183.

(60) Provisional application No. 61/230,530, filed on Jul. 31, 2009.

(51) Int. Cl.
G06F 7/38 (2006.01)
G06F 21/53 (2013.01)
G06F 9/30 (2006.01)

(52) U.S. Cl.
CPC .............. *G06F 21/53* (2013.01); *G06F 9/3004* (2013.01)
USPC ........... 712/234; 712/220; 712/224; 712/226; 717/154; 726/22

(58) Field of Classification Search
None
See application file for complete search history.

(56) References Cited

U.S. PATENT DOCUMENTS

| | | | |
|---|---|---|---|
| 5,859,999 A * | 1/1999 | Morris et al. | 712/224 |
| 6,505,300 B2 | 1/2003 | Chan et al. | |
| 6,918,029 B2 * | 7/2005 | Wilson | 712/221 |
| 6,961,930 B1 * | 11/2005 | Waldspurger et al. | 717/141 |
| 7,120,905 B2 * | 10/2006 | Dutta et al. | 717/156 |
| 7,178,011 B2 * | 2/2007 | Seal et al. | 712/226 |
| 7,386,885 B1 | 6/2008 | Kaspersky et al. | |
| 7,467,370 B2 | 12/2008 | Proudler et al. | |
| 7,565,532 B2 | 7/2009 | Pham et al. | |
| 8,621,619 B2 * | 12/2013 | Yee et al. | 726/22 |
| 2003/0079108 A1 * | 4/2003 | Wilson | 712/2 |
| 2004/0230791 A1 * | 11/2004 | Boebert et al. | 713/150 |
| 2004/0250051 A1 * | 12/2004 | Seal et al. | 712/226 |
| 2004/0255097 A1 * | 12/2004 | Seal et al. | 712/209 |
| 2005/0246718 A1 * | 11/2005 | Erlingsson et al. | 719/317 |
| 2006/0224867 A1 * | 10/2006 | Tran | 712/226 |
| 2006/0253548 A1 | 11/2006 | Vitanov et al. | |
| 2009/0077354 A1 * | 3/2009 | Rangan et al. | 712/224 |
| 2009/0282474 A1 | 11/2009 | Chen et al. | |
| 2009/0282477 A1 | 11/2009 | Chen et al. | |
| 2011/0029820 A1 | 2/2011 | Sehr et al. | |

FOREIGN PATENT DOCUMENTS

WO   WO 2006/070939   7/2006

OTHER PUBLICATIONS

'Software Fault Isolation: a first step towards Microreboot in legacy C applications' by Timothy Fraser, May 20, 2005.*
'Lightweight Module Isolation for Sensor Nodes' by Nirmal Weerasinghe et al., Workshop on Virtualization in Mobile Computing, 2008.*
Wikipedia article on 'ARM Architecture' from Jun. 1, 2009.*
'Efficient, Verifiable Binary Sandboxing for a CISC Architecture' by Stephen McCamant et al., Computer Science and Artificial Intelligence Laboratory Technical Report, MIT, May 2, 2005.*
'Predicated Instructions for Code Compaction' by Warren Cheung et al., from SCOPES 2003, pp. 17-32.*
'The Effects of Predicated Execution on Branch Prediction' by Gary Scott Tyson, copyright ACM, 1994.*

* cited by examiner

*Primary Examiner* — Steven Snyder
(74) *Attorney, Agent, or Firm* — Fish & Richardson P.C.

(57) ABSTRACT

Some embodiments provide a system that executes a native code module. During operation, the system obtains the native code module. Next, the system loads the native code module into a secure runtime environment. Finally, the system safely executes the native code module in the secure runtime environment by using a set of software fault isolation (SFI) mechanisms that use predicated store instructions and predicated control flow instructions, wherein each predicated instruction from the predicated store instructions and the predicated control flow instructions is executed if a mask condition associated with the predicated instruction is met.

18 Claims, 3 Drawing Sheets

PREDICATED CONTROL FLOW AND STORE INSTRUCTIONS FOR NATIVE CODE MODULE SECURITY

RELATED APPLICATION

This application is a continuation-in-part of U.S. application Ser. No. 12/621,286, entitled "Native Code Module Security for ARM Instruction Set Architectures," by inventors Robert Muth, Karl Schimpf, David C. Sehr, and Cliff L. Biffle, filed 18 Nov. 2009, which claims the benefit of U.S. Provisional Application No. 61/230,530, entitled "Native Code Module Security for ARM Instruction Set Architectures," by inventors Robert Muth, Karl Schimpf, David C. Sehr, and Cliff L. Biffle, filed 31 Jul. 2009.

The subject matter of this application is related to the subject matter in a co-pending non-provisional application by J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008.

The subject matter of this application is also related to the subject matter in a co-pending non-provisional application by J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008.

BACKGROUND

1. Field

The present embodiments relate to techniques for safely executing native code modules. More specifically, the present embodiments relate to a method and system for safely executing native code modules using predicated control flow and store instructions.

2. Related Art

Easy access to computers and plentiful network bandwidth have facilitated sharing of information and applications. For instance, a user of a computing device (e.g., personal computer, mobile phone, personal digital assistant, etc.) may easily install and execute an application downloaded from a website or received from a friend as an email attachment. However, installing and executing such applications on a given computing device typically involves a level of trust that is granted on an all-or-nothing basis by the operating system of the computing device. Furthermore, bugs in the operating system may inadvertently allow applications to access resources As a result, some (e.g., native) applications may have full access to the operating system and/or resources of the computing device, while other (e.g., web) applications may have little to no direct access to the operating system and/or resources of the computing device.

Such coarse-grained application of trust may negatively impact the execution of all applications on the computing device. For example, native applications may produce unwanted side effects by modifying files on the computing device and/or engaging in computation or communication outside of the tasks or features requested by the user. On the other hand, web applications may execute one to two orders of magnitude more slowly than native applications and may provide limited functionality to the user.

Hence, what is needed is a technique for facilitating finer-grained application of trust to software executing on computing devices.

SUMMARY

Some embodiments provide a system that executes a native code module. During operation, the system obtains the native code module. Next, the system loads the native code module into a secure runtime environment. Finally, the system safely executes the native code module in the secure runtime environment by using a set of software fault isolation (SFI) mechanisms that use predicated store instructions and predicated control flow instructions, wherein each predicated instruction from the predicated store instructions and the predicated control flow instructions is executed if a mask condition associated with the predicated instruction is met.

In some embodiments, the system also validates the native code module using one or more of the SFI mechanisms prior to executing the native code module in the secure runtime environment.

In some embodiments, the secure runtime environment is for an ARM instruction set architecture.

In some embodiments, using the predicated store instructions and the predicated control flow instructions involves executing a comparison instruction using the mask condition and a destination address associated with the predicated instruction, and executing the predicated instruction based on one or more condition codes modified by the comparison instruction.

In some embodiments, the comparison instruction includes a notational-and instruction that logically compares a first set of bits from the mask condition with a second set of bits from the destination address.

In some embodiments, the one or more condition codes include a zero flag that is set if the notational-and instruction returns a set of zero bits.

In some embodiments, the predicated instruction is executed if the zero flag is set, and the predicated instruction is skipped if the zero flag is cleared.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for safely executing a native code module. The native code module may contain native code that is executed within a secure runtime environment that isolates the native code module from sensitive data and resources on the computing system. The native code module may additionally be validated by a validator prior to execution within the secure runtime environment to ensure that the native code module complies with a set of security constraints. Furthermore, the native code module may be used to perform computationally intensive operations for a web application executing within a web browser.

More specifically, embodiments provide a method and system for maintaining security for the native code module using predicated control flow and store instructions. Each predicated instruction is executed only if a mask condition associated with the predicated instruction is met. For example, a predicated instruction may be preceded by a comparison instruction that performs a bitwise-and of a destination address associated with the predicated instruction and a set of mask bits. The comparison instruction may update a set of condition codes based on the result of the bitwise-and instead of computing and storing the result of the bitwise-and. The predicated instruction may then be executed based on the condition codes. For example, the predicated instruction may be executed if a zero flag associated with the comparison instruction is set and skipped if the zero flag is cleared. Such use of comparison instructions and predicated instructions may reduce overhead associated with executing the native code module while ensuring that control flow and store instructions are effectively constrained.

Figure 1:
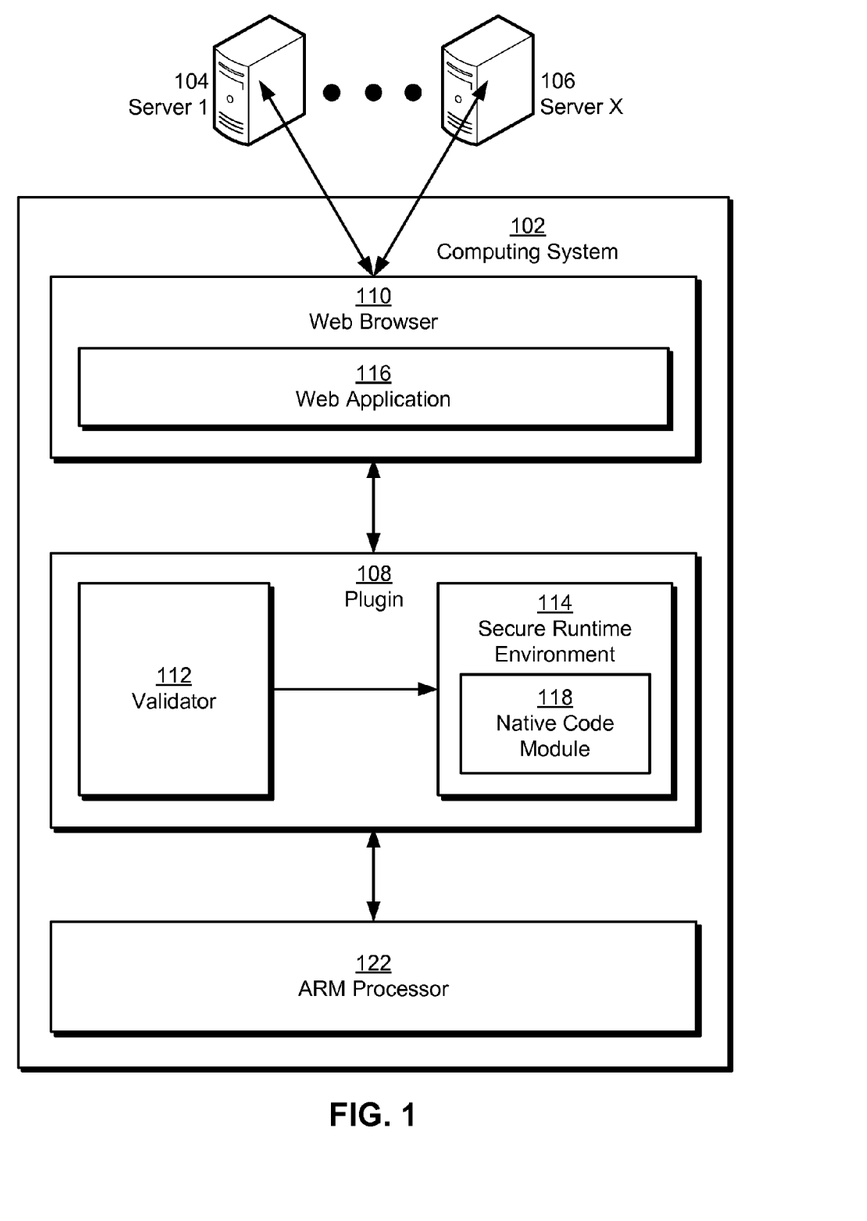
FIG. 1 shows a schematic of an embodiment of a system.

FIG. 1 shows a schematic of an exemplary system. This exemplary system includes a computing system 102 and a set of servers (e.g., server 1 104, server x 106). Computing system 102 includes a web application 116 running within a web browser 110, a plugin 108, and an ARM processor 122. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., ARM processor 122, memory, I/O components, network interface card, graphics-processing unit (GPU), etc.) on computing system 102 from the operating system, as well as interact with the user through a hardware and/or software framework provided by the operating system, as described below.

In one or more embodiments, computing system 102 includes functionality to obtain and/or execute applications using a network connection. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, hardware, etc.) associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may obtain and execute a native code module 118 within plugin 108. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application. Furthermore, native code module 118 may be obtained from local storage (e.g., a browser cache) on computing system 102 instead of from a server.

More specifically, native code module 118 may correspond to a software module containing native code that runs directly on hardware provided by computing system 102, such as a CPU (e.g., ARM processor 122). As a result, native code module 118 may be used to perform tasks that require substantial access to CPU resources on computing system 102. For example, native code module 118 may be used by web application 116 to provide computationally intensive features associated with physics simulation, signal processing, artificial intelligence, modeling, flexible high-throughput cryptography, and/or multimedia editing and analysis.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform-independent with respect to the operating system, web browser 110, and/or other software components on computing system 102. As described in the above-referenced applications, plugin 108 and/or native code module 118 may also include mechanisms for executing on a variety of instruction set architectures, including the use of "fat binaries" and binary translators.

However, native code module 118 may not be platform-independent with respect to the instruction set architecture (ISA) of one or more processors (e.g., ARM processor 122) in computing system 102. In particular, different ISAs may implement data types, instructions, registers, addressing modes, memory architecture, interrupt and exception handling, and/or external input/output (I/O) differently. Accordingly, instructions and mechanisms for executing software modules (e.g., web browser 110, native code module 118, plugin 108, etc.) directly on hardware may vary between different ISAs. Moreover, execution of the same software module within multiple ISAs may require that the software module be recompiled into a different binary executable for each ISA. For example, an x86 64-bit implementation of native code module 118 may utilize 64-bit addresses, a flat segmentation model of memory, and 64-bit general-purpose registers (GPRs), while an x86 32-bit implementation of native code module 118 may utilize 32-bit addresses, a multi-segment model of memory, and 32-bit GPRs.

Differences in ISA implementations may additionally affect security mechanisms used to validate and execute native code module 118. More specifically, the security mechanisms described in the above-referenced applications for executing native code modules within x86 ISAs may not pertain to mechanisms for safely executing native code modules within x86 64-bit or ARM ISAs. Consequently, the functionality of validator 112 and/or secure runtime environment 114 may require adaptation for use within a variety of ISAs.

In one or more embodiments, the system of FIG. 1 includes functionality to safely execute native code module 118 within an ARM ISA. In other words, plugin 108 and web browser 110 may correspond to software modules that execute directly on ARM processor 122 using the ARM ISA. Moreover, native code module 118 may correspond to a set of ARM instructions and data that is loaded into the address space of ARM processor 122 and used to facilitate the execution of web application 116.

As with native code modules in x86 environments, the secure execution of native code module 118 on ARM processor 122 may be facilitated by validator 112 and/or secure runtime environment 114. In particular, validator 112 and secure runtime environment 114 may enable safe execution of native code module 118 on ARM processor 122 using a set of software fault isolation (SFI) mechanisms in lieu of hardware segmented memory support available in x86 ISAs. Such SFI mechanisms may maintain control flow integrity for native code module 118 and/or constrain store instructions in native code module 118.

Validator 112 and secure runtime environment 114 may also be configured to maintain security for native code modules within x86 64-bit ISAs. Native code module security within x86 64-bit ISAs is described in a co-pending non-provisional application by David C. Sehr, Bennet S. Yee, J. Bradley Chen, and Victor Khimenko, entitled "Native Code Module Security for 64-bit Instruction Set Architectures," having Ser. No. 12/621,266, and filing date Nov. 18, 2009, which is incorporated herein by reference.

In one or more embodiments, native code module 118 is loaded into memory of computing system 102 for inspection by validator 112. Once loaded into memory, page table protection provided by the operating system of computing system 102 may prevent native code module 118 from being modified. As discussed below with respect to FIG. 2, page table protection may additionally provide SFI mechanisms for restricting instruction execution in native code module 118 to a code region in the address space and data accesses to the code region or a data region in the address space.

In one or more embodiments, validator 112 performs static binary analysis on native code module 118 to ensure that native code module 118 conforms to a set of security constraints. If native code module 118 does not conform to the security constraints, validator 112 may discard native code module 118 prior to loading native code module 118 into secure runtime environment 114.

During analysis of native code module 118, validator 112 may ensure that native code module 118 is statically linked at a start address of zero (e.g., providing a zero-based address range for native code module 118) with the first byte of text at 128 Kbytes after the start address. Validator 112 may then sequentially disassemble and/or decode all executable instructions within native code module 118, beginning with the first byte of text at 128 Kbytes after the start address. During disassembly, validator 112 may verify that native code module 118 does not contain any "unsafe" or otherwise restricted instructions, such as instructions that directly invoke the operating system, hardware performance instructions, and/or complex addressing modes. As discussed below, validator 112 may also verify that data blocks within a code region associated with native code module 118 begin with illegal instructions.

Once native code module 118 is validated, native code module 118 is executed in secure runtime environment 114. As described in the above-referenced applications, secure runtime environment 114 may load and launch native code module 118 from memory; provide an execution environment that includes communications, threads, memory management, and debugging support for native code module 118; moderate access to system resources according to an access policy for native code module 118; and/or support the isolated execution of multiple native code modules on computing system 102. Consequently, secure runtime environment 114 may provide additional SFI mechanisms for ensuring the secure execution of native code module 118 on computing system 102. In particular, secure runtime environment 114 may restrict access from native code module 118 to registers, memory, and/or other resources associated with the ARM ISA.

As discussed in the above-referenced applications, validator 112 and/or secure runtime environment 114 may enforce security for native code module 118 by providing pseudo-instructions that mask certain instructions within native code module 118. In one or more embodiments, pseudo-instructions are used to constrain both control flow instructions and store instructions within the ARM ISA. Furthermore, the SFI mechanisms provided by validator 112 and/or secure runtime environment 114 may ensure that all instructions within each pseudo-instruction are executed sequentially or not at all.

In one or more embodiments, validator 112 and/or secure runtime environment 114 provide SFI mechanisms that enforce control flow integrity by restricting the execution of certain instructions, ensuring that data blocks are never executed, validating direct control flow instructions, and/or masking destination addresses associated with indirect control flow instructions. More specifically, validator 112 may ensure that control flow instructions in native code module 118 are restricted to branch-and-link (e.g., bl) instructions and branch-and-exchange (e.g., bx) instructions. In other words, validator 112 may disable program counter (e.g., R15 register) updates using general register move instructions or load multiple (e.g., ldm) instructions. Alternatively, program counter updates may be used to mask indirect control flow instructions. Furthermore, validator 112 and/or secure runtime environment 114 may disable the use of Thumb instructions in native code module 118. Such restrictions may simplify control flow analysis by validator 112 with little to no performance impact during execution of native code module 118.

In addition, validator 112 and/or secure runtime environment 114 may ensure that data blocks within the code region associated with native code module 118 are never executed. As mentioned previously, page table protection may restrict instruction execution in native code module 118 to a code region of the address space. However, the ARM ISA may store both executable instructions and data (e.g., constant pools) within the code region. To prevent data from being executed, the SFI mechanisms may divide the code region into equally sized, aligned 16-byte blocks containing either code (e.g., code blocks) or data (e.g., data blocks), start each data block in the code region with an illegal instruction, and ensure that each indirect control flow instruction targets the beginning of an aligned 16-byte code block.

To validate direct control flow instructions, validator 112 may statically compute direct control flow targets and confirm that the targets correspond to valid instructions. To validate indirect control flow instructions (e.g., instructions with targets computed at runtime), validator 112 may verify that each indirect control flow instruction is part of a multi-instruction sequence (e.g., pseudo-instruction) with appropriate address masking operations during loading of native code module 118 into memory.

In one or more embodiments, validator 112 ensures that a set of upper bits and a set of lower bits in each destination address associated with each indirect control flow instruction and/or store instruction are cleared. The cleared bits may prevent the instructions from accessing restricted portions of the address space. For example, validator 112 may use a masking instruction to ensure that the first bit of each store instruction's destination address is cleared, which in turn keeps the destination address in the first 2 Gbytes of the address space.

More specifically, validator 112 may use pseudo-instructions that contain predicated control flow and store instructions. Each pseudo-instruction may additionally include a comparison instruction that precedes a predicated instruction. The comparison instruction may examine a destination address of the predicated instruction to ensure that the destination address meets a mask condition associated with the predicated instruction. For example, the comparison instruction may correspond to a notational-and instruction (e.g., tst) that performs a bitwise-and of a first set of bits from the mask condition with a second set of bits from the destination address. Furthermore, the comparison instruction may modify one or more condition codes. For example, instead of computing and storing a result associated with the bitwise-and, the notational-and instruction may modify a zero flag based on the result of the bitwise-and; the zero flag may be set if the result is a set of zero bits, or the zero flag may be cleared if the result contains one or more nonzero bits.

The predicated instruction may then be executed based on the condition codes. For example, the predicated instruction may be executed if the zero flag is set, which indicates that the destination address meets the mask condition. On the other hand, the predicated instruction may be skipped if the zero flag is cleared, which indicates that the destination address does not meet the mask condition. Comparison instructions, mask conditions, and predicated control flow and store instructions are discussed in further detail below with respect to FIGS. 2A-2C.

Because pseudo-instructions that use comparison and predicated instructions do not store the results of masking destination addresses, the use of such pseudo-instructions may be more efficient than the use of pseudo-instructions that contain masking instructions. For example, a pseudo-instruction that contains a tst instruction followed by a streq instruction may require two fewer clock cycles than a pseudo-instruction that contains a bic instruction followed by an str instruction. A similar increase in efficiency may be enabled for native code modules associated with other ISAs if such ISAs provide predicated control flow and/or store instructions. Consequently, overhead associated with executing native code modules in a variety of ISAs may be reduced by using predicated control flow and store instructions in lieu of masking instructions in pseudo-instructions within the native code modules.

Figure 2A:
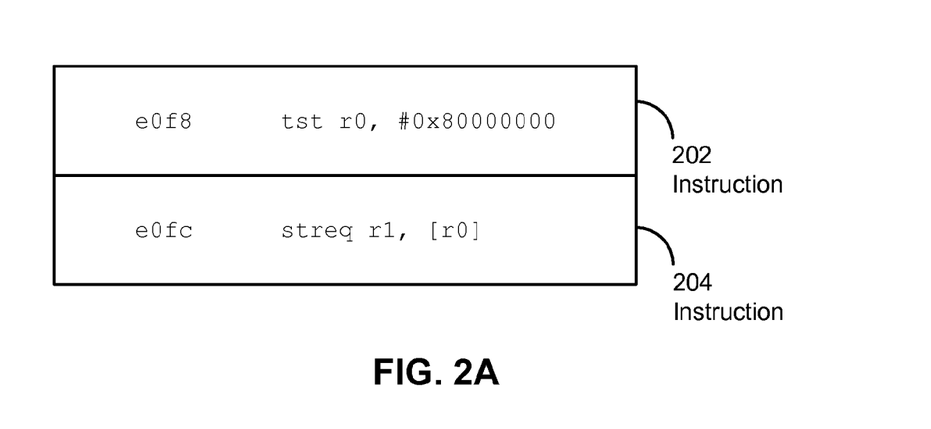
FIG. 2A shows an exemplary pseudo-instruction in accordance with an embodiment.

FIG. 2A shows an exemplary pseudo-instruction in accordance with an embodiment. More specifically, FIG. 2A shows a pseudo-instruction for constraining a store (e.g., str) instruction in a native code module, such as native code module 118 of FIG. 1. The pseudo-instruction includes two instructions 202-204 at offsets of e0f8 and e0fc. As a result, instructions 202-204 may be stored in the last two sections of an aligned 16-byte code block containing four sections, each of which stores a four-byte instruction.

As discussed above, the pseudo-instruction may include a predicated store instruction 204 (e.g., streq r1, [r0]) corresponding to the store instruction that is executed if a mask condition associated with the store is met. As shown in FIG. 2A, a comparison instruction 202 (e.g., tst r0, #0x80000000) may be executed immediately before instruction 204 to determine if the mask condition is met. In particular, instruction 202 may correspond to a notational-and instruction that performs a bitwise-and using a destination address of instruction 204 (e.g., the contents of the r0 register) and a mask value (e.g., #0x80000000) corresponding to the mask condition.

Instruction 202 may additionally update one or more condition codes. The condition codes may be stored in a Current Program Status Register (CPSR) provided by the ARM ISA and may correspond to the Negative, Zero, Carry, and/or Overflow (e.g., N, Z, C, V) bits of the CPSR. Instruction 202 may update the Z bit of the CPSR based on the bitwise-and of the destination address and mask value. If the bitwise-and produces all zero bits, the Z bit is set. On the other hand, if the bitwise-and produces one or more nonzero bits, the Z bit is cleared.

Because instruction 204 includes the "eq" suffix, instruction 204 is executed only if the Z bit is set by instruction 202. Conversely, instruction 204 is skipped if the Z bit is cleared by instruction 202. In other words, the pseudo-instruction may constrain stores to the destination address stored in the r0 register by executing instruction 204 only if the destination address conforms to the mask condition (e.g., a cleared first bit) for stores in the native code module instead of directly masking the contents of the r0 register.

Figure 2B:
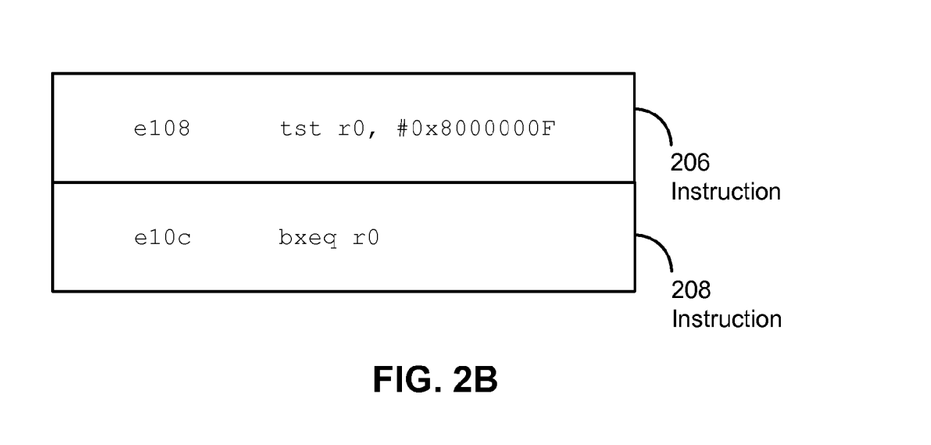
FIG. 2B shows an exemplary pseudo-instruction in accordance with an embodiment.

FIG. 2B shows an exemplary pseudo-instruction in accordance with an embodiment. In particular, FIG. 2B shows a pseudo-instruction for constraining a branch-and-exchange (e.g., bx) control flow instruction in a native code module. In addition, the pseudo-instruction of FIG. 2B may be used to constrain other branching control flow instructions, such as bl instructions and/or blx instructions.

As with FIG. 2A, the pseudo-instruction of FIG. 2B includes two instructions 206-208 at offsets of e108 and e10c in the last two sections of an aligned 16-byte block. Moreover, instruction 206 corresponds to a notational-and instruction that sets a Z bit of the CPSR if the destination address of instruction 208 (e.g., the contents of the r0 register) meets the mask condition represented by the mask value of #0x8000000F. The mask condition may be used to ensure that the target of the branch-and-exchange instruction is aligned along a 16-byte alignment boundary and remains within a code region in the first 2 Gbytes in the address space.

Instruction 208 may then be executed based on the setting or clearing of the Z bit by instruction 206. If the Z bit is set (e.g., the destination address meets the mask condition), instruction 208 is permitted to branch to the destination address. If the Z bit is cleared (e.g., the destination address does not meet the mask condition), instruction 208 is skipped to prevent code execution from reaching a restricted region of the address space.

Figure 2C:
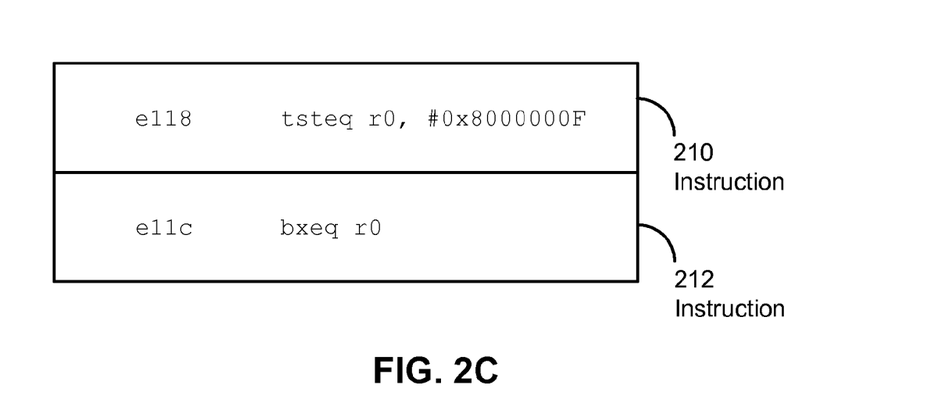
FIG. 2C shows an exemplary pseudo-instruction in accordance with an embodiment.

FIG. 2C shows an exemplary pseudo-instruction in accordance with an embodiment. The pseudo-instruction of FIG. 2C may be used to constrain a predicated branch-and-exchange (e.g., bxeq) instruction 212 in a native code module. As with FIGS. 2A-2B, the pseudo-instruction of FIG. 2C includes two instructions 210-212 at offsets of e118 and e11c in the last two sections of an aligned 16-byte block.

Because the branching instruction 212 to be constrained already contains a predicate that requires the Z bit to be set, the predicate is also applied to a comparison instruction 210 preceding instruction 212 in the pseudo-instruction so that instruction 210 does not inadvertently set the Z bit if the Z bit was cleared prior to instruction 210. In other words, the predicated execution of instruction 210 may prevent instruction 210 from interfering with the intended execution or skipping of instruction 212 based on the value of the Z bit prior to modification by instruction 210. The pseudo-instruction of FIG. 2C may also be adapted to other branching instructions with the "eq" suffix, such as bleq instructions and/or blxeq instructions.

Figure 3:
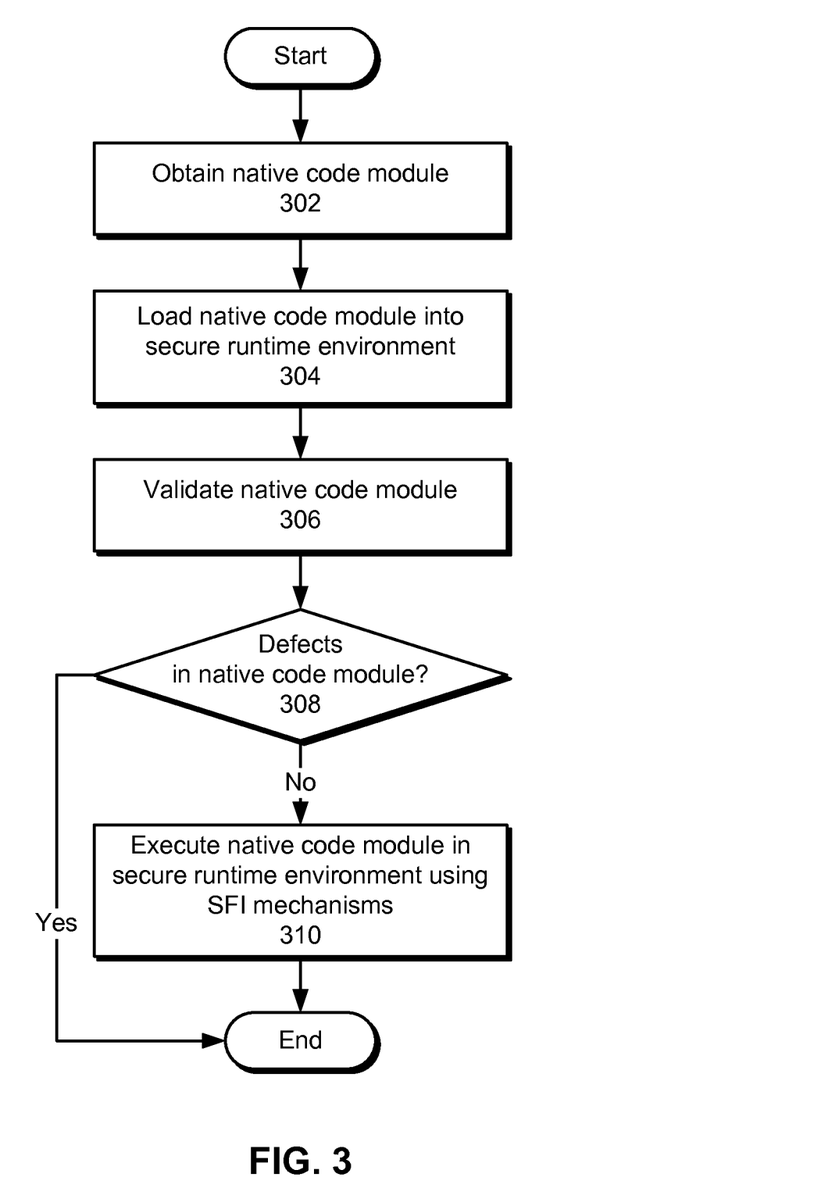
FIG. 3 shows a flowchart illustrating the process of executing a native code module in accordance with an embodiment.

FIG. 3 shows a flowchart illustrating the process of executing a native code module in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, the native code module is obtained (operation 302). The native code module may be obtained from one or more servers and/or compiled from source code. In addition, the native code module may be used to facilitate the execution of a web application, such as a JavaScript application. For example, the native code module may be used to perform computationally intensive operations for the web application.

Next, the native code module is loaded into a secure runtime environment (operation 304). For example, the native code module may be loaded into a secure runtime environment for an ARM ISA and/or another ISA that contains predicated control flow and/or store instructions. The loaded native code module is then validated (operation 306) using one or more SFI mechanisms prior to executing the native code module. During validation, the native code module may be inspected for conformity to a set of security constraints. In particular, the native code module may be inspected to detect defects that do not conform to the security constraints (operation 308). If the native code module does not conform to the security constraints (e.g., the validator detects defects in the native code), the native code module is discarded without having been executed.

If the validator does not detect defects in the native code module, the native code module is executed in the secure runtime environment using the SFI mechanisms (operation 310). The secure runtime environment may be provided by a plugin associated with the web browser, a browser extension to the web browser, and/or a component within the web browser. The SFI mechanisms may use predicated store instructions and predicated control flow instructions to constrain stores and control flow in the native code module. Each predicated instruction from the predicated store and/or predicated control flow instructions may be executed if a mask condition associated with the predicated instruction is met. In particular, the predicated instruction may be preceded by a comparison instruction that determines if a destination address associated with the predicated instruction meets the mask condition. The comparison instruction may modify one or more condition codes, which are then used to execute or skip the predicated instruction.

Consequently, the SFI mechanisms used to validate and execute the native code module may enable secure execution of the native code module directly on hardware with low performance overhead while maintaining portability and platform independence across different web browsers and operating systems. In particular, the SFI mechanisms may provide per-thread protection that constrains threads used to execute untrusted code in the native code module while allowing trusted code used to validate and execute the native code module to execute without constraints. Furthermore, the SFI mechanisms may improve performance by minimizing overhead associated with enforcing mask conditions for control flow and store instructions. Finally, the direct execution of the native code module on hardware may allow the native code module to execute on a variety of processors and operating systems without modification.

The foregoing descriptions of various embodiments have been presented only for purposes of illustration and description. They are not intended to be exhaustive or to limit the present embodiments to the forms disclosed. Accordingly, many modifications and variations will be apparent to practitioners skilled in the art. Additionally, the above disclosure is not intended to limit the present embodiments.

What is claimed is:

1. A computer-implemented method for executing a native code module, comprising:
   obtaining the native code module in a computing system;
   validating, by the computing system, the native code module, by performing operations that include:
      identifying each branch instruction and each store instruction in the native code module that has a respective computed destination address,
      comparing the respective computed destination addresses of the identified branch instructions and store instructions with a predetermined address constraint,
      setting, as a result of the comparing, one or more processor condition codes that indicate whether a validation condition is satisfied, and
      verifying that each of the identified branch instructions and store instructions is a predicated instruction that is executed only if the validation condition indicated by the one or more processor condition codes is satisfied; and
   in response to validating the native code module, executing the native code module in a secure runtime environment of the computing system.

2. The computer-implemented method of claim 1, wherein the secure runtime environment is for an Advanced Reduced Instruction Set Computing (RISC) Machine (ARM) instruction set architecture.

3. The computer-implemented method of claim 1, wherein comparing the respective computed destination addresses with the predetermined address constraint includes using a comparison instruction that logically compares a mask value with the computed destination address to determine whether or not the computed destination address satisfies the predetermined address constraint.

4. The computer-implemented method of claim 3, wherein the comparison instruction comprises a notational-and instruction that logically compares a first set of bits from a mask condition with a second set of bits from the computed destination address.

5. The computer-implemented method of claim 4, wherein the one or more processor condition codes comprise a zero flag that is set if the notational-and instruction returns a set of zero bits.

6. The computer-implemented method of claim 5,
   wherein the predicated instruction is executed if the zero flag is set, and
   wherein the predicated instruction is skipped if the zero flag is cleared.

7. A system for executing a native code module, comprising:
   a web browser configured to obtain the native code module;
   a validator configured to validate the native code module by:
      identifying each branch instruction and each store instruction in the native code module that has a respective computed destination address,
      comparing the respective computed destination addresses of the identified branch instructions and store instructions with a predetermined address constraint,
      setting, as a result of the comparing, one or more processor condition codes that indicate whether a validation condition is satisfied, and
      verifying that each of the identified branch instructions and store instructions is a predicated instruction that is executed only if the validation condition indicated by the one or more processor condition codes is satisfied; and
   a secure runtime environment associated with the web browser, wherein the secure runtime environment is configured to execute the native code module in response to the native code module having been validated.

8. The system of claim 7, wherein the secure runtime environment is for an Advanced Reduced Instruction Set Computing (RISC) Machine (ARM) instruction set architecture.

9. The system of claim 7, wherein comparing the respective computed destination addresses with the predetermined address constraint includes using a comparison instruction that logically compares a mask value with the computed destination address to determine whether or not the computed destination address satisfies the predetermined address constraint.

10. The system of claim 9, wherein the comparison instruction comprises a notational-and instruction that logically compares a first set of bits from a mask condition with a second set of bits from the computed destination address.

11. The system of claim 10, wherein the one or more processor condition codes comprise a zero flag that is set if the notational-and instruction returns a set of zero bits.

12. The system of claim 11,
   wherein the predicated instruction is executed if the zero flag is set, and
   wherein the predicated instruction is skipped if the zero flag is cleared.

13. A non-transitory computer-readable storage medium storing instructions that when executed by one or more processors cause performance of operations for executing a native code module, the operations comprising:
   obtaining the native code module in a computing system;
   validating, by the computing system, the native code module, by performing operations that include:
      identifying each branch instruction and each store instruction in the native code module that has a respective computed destination address,
      comparing the respective computed destination addresses of the identified branch instructions and store instructions with a predetermined address constraint,
      setting, as a result of the comparing, one or more processor condition codes that indicate whether a validation condition is satisfied, and
   verifying that each of the identified branch instructions and store instructions is a predicated instruction that is executed only if the validation condition indicated by the one or more processor condition codes is satisfied; and in response to validating the native code module, executing the native code module in a secure runtime environment of the computing system.

14. The computer-readable storage medium of claim 13, wherein the secure runtime environment is for an Advanced Reduced Instruction Set Computing (RISC) Machine (ARM) instruction set architecture.

15. The computer-readable storage medium of claim 13, wherein comparing the respective computed destination addresses with the predetermined address constraint includes using a comparison instruction that logically compares a mask value with the computed destination address to determine whether or not the computed destination address satisfies the predetermined address constraint.

16. The computer-readable storage medium of claim 15, wherein the comparison instruction comprises a notational-and instruction that logically compares a first set of bits from a mask condition with a second set of bits from the computed destination address.

17. The computer-readable storage medium of claim 16, wherein the one or more processor condition codes comprise a zero flag that is set if the notational-and instruction returns a set of zero bits.

18. The computer-readable storage medium of claim 17,
wherein the predicated instruction is executed if the zero flag is set, and
wherein the predicated instruction is skipped if the zero flag is cleared.

\* \* \* \* \*